INVENTOR.
GEORGE R. BRIGGS
BY Morris Rabkin
ATTORNEY

MAGNETIC SYSTEMS

Filed March 1, 1955

INVENTOR.
GEORGE R. BRIGGS
BY Morris A. Rabkin
ATTORNEY

INVENTOR.
GEORGE R. BRIGGS
BY
ATTORNEY

INVENTOR.
GEORGE R. BRIGGS
BY
Morris A. Rahain
ATTORNEY

United States Patent Office 2,886,801
Patented May 12, 1959

2,886,801

MAGNETIC SYSTEMS

George R. Briggs, Princeton, N.J., assignor to Radio Corporation of America, a corporation of Delaware Application March 1, 1955, Serial No. 491,370
23 Claims. (Cl. 340—174)

This invention relates to control systems, and particularly to improved systems for controlling electrical signals representing information or intelligence, or for controlling electrical power by means of magnetic cores.

Examples of the use of magnetic cores may be found in electrical computers having logical circuits and storage circuits and in magnetic amplifier devices. The magnetic core logical circuits and storage circuits utilize the magnetic material of the cores as a static storage medium. In magnetic amplifier devices, the operation depends on the combined effect of a simultaneous energizing source and a controlling signal on the magnetic material. By means of the present invention, magnetic cores fabricated from a magnetic material having substantially rectangular hysteresis loops are employed to obtain advantages found in both magnetic core circuits and in magnetic amplifier devices.

It is an object of the present invention to provide a novel and improved magnetic system by means of which electrical signals representing, for example, information can be controlled in accordance with the setting of a single impulse.

Another object of the present invention is to provide an improved magnetic system for controlling electric signals in such a manner that continuous control is obtained by setting the system to a desired state.

Still another object of this invention is to provide an improved magnetic system for storing information.

Yet another object of this invention is to provide an improved magnetic system and method of operation thereof for controlling electric signals in such a manner that no holding power is required in the exercise of such control.

A further object of the present invention is to provide an improved magnetic system for storing information such that the stored information can be repeatedly read out without restoration.

According to the invention, material characterized by a substantially rectangular hysteresis loop is employed. A plurality of cores fabricated from the "rectangular" material are interconnected by means of a circulating loop. A setting winding is linked in a desired sense to each of the cores. An input winding and an output winding are each linked to one core. By applying an electrical pulse of either the one or the other polarity to the respective setting windings, the respective cores are selectively excited to saturation in a desired direction of magnetization. Electrical signals applied to the input winding do or do not produce a change in the drection of magnetization of the one core in accordance with the polarity of the last previous setting pulse. When a setting pulse of the one polarity is applied, the magnetization of the one core is reversed back and forth between the two directions of magnetization by the input signals. Each time the magnetization of the one core is reversed energy is transferred to a utilization device connected to the output winding linked to the one core. When a setting pulse of the polarity opposite to the one polarity is applied, the magnetization of the one core remains substantially unchanged, and substantially no energy is transferred to the utilization device in response to the input signals. The energy may represent intelligence, information, etc., or supply controlled power to a utilization device.

In certain embodiments of the invention, three cores are employed, and in other embodiments of the invention, only two cores are employed.

The invention will be more fully understood, both as to its organization and method of operation, from the following description when read in connection with the accompanying drawing wherein similar reference characters are used to designate similar elements, and in which.

Figures 1, 2, 3:
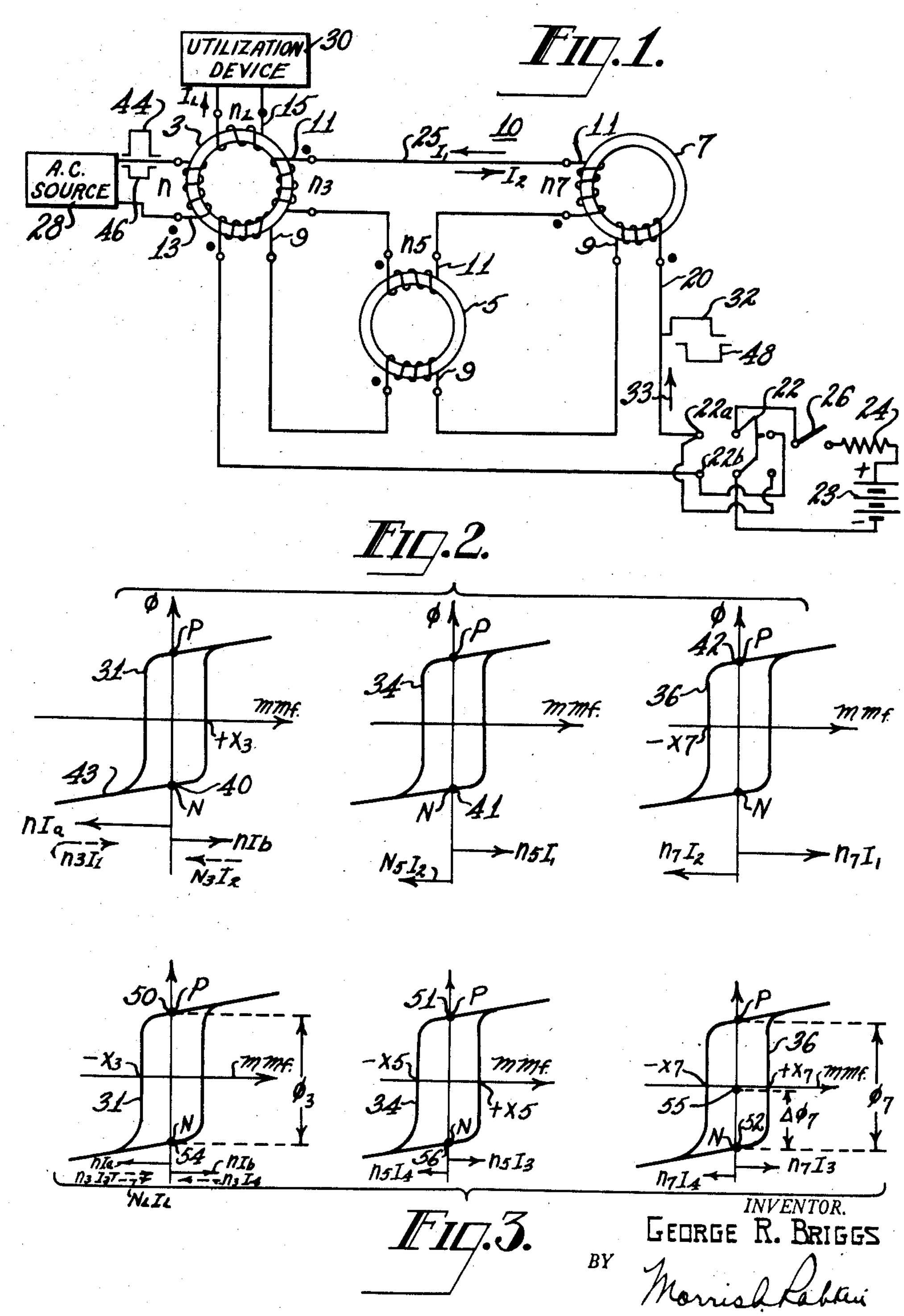
Fig. 1 is a schematic diagram of a magnetic system according to the invention employing three magnetic cores.
Figs. 2 and 3 are graphs, somewhat idealized, of the hysteresis loops of the corresponding cores of Fig. 1, and are useful in explaining the operation of the system of Fig. 1.

In Fig. 1, the magnetic system 10 includes the magnetic cores 3, 5 and 7. The three cores are fabricated from a magnetic material characterized by a substantially rectangular hysteresis loop. Certain ceramic materials such as manganese-magnesium ferrite, and certain metallic materials such as mo-Permalloy, exhibit the desired rectangular hysteresis characteristics. Each of the cores is linked by a setting winding 9 and a circulating winding 11. The core 3 is also linked by an input winding 13 and an output winding 15. The sense of linkage of each setting winding 9 and each circulating winding 11 to the respective cores is indicated by a conventional polarity-indicating dot. Application of a positive current, that is, one positive with respect to a given reference level, to a dot-marked terminal produces a magnetizing force (M.M.F.) which generates a flux oriented in a clockwise sense (as viewed in the drawing) around a core, and vice versa, for a negative current. Likewise, a flux flow increasing in the clockwise direction in a core induces a voltage across a winding so as to make the dot-marked terminal more positive than the unmarked terminal. The individual setting windings 9 of the cores 3 and 5 are connected in series aiding with each other, as by connecting the dot-marked terminal of setting winding 9 of the core 5 to the unmarked terminal of that of the core 3. The setting winding 9 of the core 7 is connected in series opposition to the setting windings 9 of the cores 3 and 5, as by connecting the unmarked terminal of the setting winding 9 of the core 7 to the unmarked terminal of the setting winding 9 of the core 5, to form a setting coil 20. The respective circulating windings 11 of the cores 3, 5 and 7 are connected in series aiding with each other to form a closed circulating loop 25. The ratio of turns (3:5:7) of the circulating windings 11 of the cores 3, 5 and 7 is indicated by the numeral of the respective reference characters $n_3$, $n_5$ and $n_7$.

Each terminal of the setting coil 20 is connected to a different one of a pair of terminals of a reversing switch 22. The arms of the reversing switch 22 are connected across a current source such as a D.C. battery 23 and a series-connected resistance 24. A single-pole, single-throw switch 26 is interposed in one of the leads which connects the reversing switch 22 to the aforementioned current source. An A.C. source 28 is connected across the terminals of the input winding 13. The A.C. source 28 may be, for example, a constant-current source arranged to furnish positive and negative current pulses of a desired amplitude to the input winding 13. A utilization device 30 is connected across the terminals of the output winding 15. The utilization device 30 may be any device responsive to an output voltage induced in the output winding 15 by a change in the magnetization of the core 3.

The operation of the magnetic system of Fig. 1 may be as follows: The reversing switch 22 is operated by throwing the movable arm to the left (as viewed in the drawing) to connect the positive terminal of the battery 23 to the upper terminal 22*a* of the setting coil 20, and the negative terminal of the battery 23 to the lower terminal 22*b* of the setting coil 20. Upon closure of the switch 26, the positive current pulse 32 flows in the setting coil 20 in the direction of the arrow 33. The pulse 32 flows into the dot-marked terminal of the setting winding 9 of the core 7 and into the unmarked terminal of each setting winding 9 of the cores 3 and 5. The M.M.F. produced by the pulse 32 generates a clockwise flux in the core 7 and a counter-clockwise flux in each of the cores 3 and 5. The M.M.F. acting on the respective cores tends to drive the core 7 to the P (clockwise) direction of magnetization and the cores 3 and 5 to the N (counter-clockwise direction of magnetization. Initially, the cores may already be magnetized in the desired direction. In such case, there is substantially no circulating current induced in the circulating coil 25. If the cores are initially magnetized in the direction opposite the desired direction, a circulating current is induced in the circulating coil 25 but flows only during the time required for switching the respective cores. If, however, one or more of the cores are initially magnetized in the direction opposite the desired direction and the other cores are magnetized in the desired direction, then a circulating current flows during the switching of these one or more cores. This latter circulating current decays in an exponential fashion due to the electrical resistance inherent in the coupling coil 25. In the latter case, the switch 26 is maintained in a closed position for a sufficiently long time to allow the latter circulating current to substantially die out when the one core is completely swtiched. An additional series resistance (not shown) can be inserted in the coupling coil 25 in order to cause the latter circulating current to decay more quickly. After each of the cores is thus set to a desired direction of magnetization, the switch 26 is opened. There is little change of the flux condition because of the rectangular hysteresis characteristic of the cores.

Consider, now, the effect of the application of the positive input pulse 44 (Fig. 1) to the unmarked terminal of the input winding 13 by the A.C. source 28. The M.M.F. generated by the input pulse 44 is in a direction tending to further saturate the core 3 in the N direction of magnetization. The M.M.F. generated by the pulse 44 is indicated in Fig. 2 by the line $nIa$ located below the hysteresis loop 31, where $n$ is the number of turns in the input winding 13 and $Ia$ represents the amplitude of the input pulse 44. Because of the rectangular hysteresis characteristic of the material, very little flux change is produced in the core 3. The point representing the magnetic state of the core traverses the bottom, flat portion of the loop 31 from the point 40 to the point 43, having nearly the same ordinate representative of nearly the same amount of flux.

In an ideally rectangular material, there would be no flux change in the core 3, and, consequently, no voltage induced across the circulating winding 11 which is linked to the core 3. However, the small flux change does produce a correspondingly small voltage across the circulating winding 11 and a small circulating current $I_1$ flows in the circulating coil 25. The circulating current $I_1$ is in a direction to generate an M.M.F. in the core 3 which is opposed to the M.M.F. generated by the input pulse 44 (Lenz's law). An M.M.F. is generated by the circulating current $I_1$ in each of the cores 5 and 7. The respective M.M.F.'s generated in the cores 3, 5 and 7 by the circulating current $I_1$ are indicated in Fig. 2 by the corresponding lines $n_3I_1$, $n_5I_1$ and $n_7I_1$ below the respective loops 31, 34 and 36, where each $n_i$ represents the number of turns in the winding $i$. The M.M.F. $n_3I_1$ tends to drive the core 3 toward the P direction of magnetization. The M.M.F. $n_5I_1$ tends to change the magnetization of the core 5 from the N direction to the P direction. However, because of the small amplitude of the circulating current $I_1$, the core 5 does not change its direction of magnetization. The M.M.F. $n_7I_1$ tends to drive the core 7 further into saturation in the P direction. However, a small unwanted output voltage is induced across the output winding 15 by the small flux change in the core 3. In the case of an ideal material exhibiting a perfectly rectangular saturation characteristic, there would be no flux change in the core 3 and accordingly there would be no voltage induced across the output winding 15. Upon the termination of the input pulse 44, the cores 3, 5 and 7 return substantially to their previous condition of magnetization as represented by the remanence points 40, 41 and 42.

If, now, a negative, input pulse 46 is applied to the unmarked terminal of the input winding 13 by the A.C. source 28, an M.M.F. tending to drive the core 3 towards the P direction of magnetization is generated. The core 3 tends to change its magnetization from the N direction to the P direction along the bottom, flat portion of the hysteresis loop 31. The M.M.F. generated by the input pulse 46 is indicated in Fig. 2 by the line $nIb$ below the loop 31.

The flux change produced in the core 3 by the input pulse 46 causes a circulating current $I_2$ to flow in the circulating coil 25. The circulating current $I_2$, in turn, generates an M.M.F. in the core 3 in a direction to oppose the M.M.F. generated by the input pulse 46. The opposing M.M.F. acting on the core 3 is indicated in Fig. 2 by the line $n_3I_2$ located beneath the loop 31. The net M.M.F. acting on the core 3 is equal to the algebraic sum of: the M.M.F. generated by the input pulse 46, the reflected M.M.F. due to the circulating current $I_2$, and another small, reflected M.M.F. generated by any unwanted current flowing in the output winding 15. The small, reflected M.M.F. due to any load current is negligible and, therefore, is not indicated in Fig. 2. The critical value of M.M.F., termed the coercive force, which is required to switch the core 3 from the N direction of magnetization to the P direction of magnetization is represented by the point $+X_3$ on the hysteresis loop 31. The net M.M.F. $X_s$ acting on the core 3 at this time is less than the coercive force $+X_3$, as described hereinafter.

The circulating current $I_2$ also generates an M.M.F. in each of the cores 5 and 7 which M.M.F.'s are indicated in Fig. 2 by the lines $n_5I_2$ and $n_7I_2$ located beneath the respective loops 34 and 36. The M.M.F. $n_5I_2$ is in a direction tending to drive the core 5 further into saturation in the N direction of magnetization. Accordingly, the core 5 remains saturated in the N direction of magnetization.

The M.M.F. $n_7I_2$, however, is in a direction tending to switch the core 7 from the P direction of magnetization to the N direction of magnetization. The condition for switching core 7 is that the M.M.F. $n_7I_2$ exceed the coercive force of the core 7 represented by the point $-X_7$ on the loop 36, or $$-I_2 > \frac{X_7}{n_7} \quad (1)$$

However, the amount of the circulating current $I_2$ is a function of the M.M.F. generated by the negative input pulse 46, or $$\frac{X_s - X_3}{n_3} = -I_2 \quad (2)$$

Therefore, by limiting the amplitude of the input pulse 46 to a value which produces an M.M.F. less than the coercive force $-X_7$ the core 7 remains unswitched. The core 3 also remains unswitched because the net M.M.F. $X_s$ is less, due to the non-switching of the core 7, than the coercive force $+X_3$. Accordingly, upon termination of the input pulse 46, the cores 3 and 7 return to the remanent conditions represented by the points 40 and 42 of the hysteresis loops 31 and 36, respectively.

There is, therefore, substantially no output voltage induced across the output winding 15, in response to the negative input pulse 46, because there is substantially no flux change in the core 3.

Accordingly, when set by the positive setting pulse 32, the system does not furnish an output signal across the output winding 15 in response either to the positive input pulse 44 or to the negative input pulse 46. This response condition conveniently can be termed the "blocked" condition in the arrangement wherein a utilization device is connected to an output winding which links the core 3. The system remains in a blocked response condition despite applications of the input pulses 44 and 46.

Assume, now, that the reversible switch 22 is operated by throwing the movable arm to the right (as viewed in the drawing) to connect the negative terminal of the battery 23 to the upper terminal 22*a* of the setting coil 20, and the positive terminal of the battery 23 to the lower terminal 22*b* of the setting coil 20. Upon closure of the switch 26, a negative setting pulse 48 flows in the setting coil 20 in a direction opposite the arrow 33. The pulse 48 flows into the marked terminal of the setting winding 9 of the core 7 and into the unmarked terminal of the setting winding 9 of each of the cores 3 and 5. The switch 26 is maintained closed for the time required for any circulating current flowing in the circulating coil 25 to decay to a substantially zero amplitude. The switch 26 is then opened. There may, however, be substantially no circulating current caused by this setting pulse 48 for reasons described hereinafter.

The remanent magnetization of the cores 3, 5 and 7, upon the opening of the switch 26, is represented in Fig. 3 by the points 50, 51 and 52 on the hysteresis loops 31, 34 and 36, respectively, the latter loops corresponding to the hysteresis loops of Fig. 2. Each of the cores is saturated at remanence. The cores 3 and 5 are saturated at remanence in the P direction of magnetization, and the core 7 is saturated at remanence in the N direction of magnetization.

Consider, now, the operation of the system 10 when the positive input pulse 44 is applied to the input winding 13 of the core 3. The M.M.F. generated by the pulse 44, and represented by the line $nIa$ beneath the loop 31, tends to switch the core 3 from the P direction of magnetization to the N direction of magnetization. Because the amplitude of the positive input pulse 44 is relatively large, the coercive force of the core 3, indicated by the point $-X_3$ of the loop 31, is exceeded and the core 3 is switched from the P direction of magnetization to the N direction of magnetization as indicated by the point 54 of the loop 32.

The flux change produced in the core 3 causes a circulating current $I_3$ to flow in the circulating coil 25 and the load current $I_l$ to flow in the output winding 15. The circulating current $I_3$ generates the M.M.F.'s $n_3I_3$, $n_5I_3$ and $n_7I_3$ in the cores 3, 5 and 7, respectively. Both the M.M.F.'s $n_LI_L$ and $n_3I_3$, shown in Fig. 3, are in a direction to oppose the M.M.F. $nIa$. However, due to the large value of the M.M.F. $nIa$, the net M.M.F. acting on the core 3 exceeds the coercive force $-X_3$. The M.M.F. $n_5I_3$ is in a direction tending to drive the core 5 further into the P direction of saturation. Therefore, substantially no flux change is produced in the core 5 by the circulating current $I_3$. The M.M.F. $n_7I_3$ is in a direction to switch core 7 from the N direction of magnetization to the P direction of magnetization. However, the core 7 is allowed to switch from the state in the N direction of magnetization, represented by the point 52, along the loop 36 to a point less than halfway to the P direction of magnetization. The remanent magnetization of the core 7 upon the termination of the input pulse 44 is represented by the point 55 of the hysteresis loop 36. The reason for limiting the flux change in the core 7 to less than one-half the total possible flux change will be apparent as the operation proceeds. Accordingly, $$n_7\Delta\phi_7 = n_3\phi_3 \quad (3)$$

where $\varphi_3$ is the total flux change produced in the core 3 in switching from the P direction of magnetization to the N direction of magnetization, and $\Delta\phi_7$ is the flux change produced in the core 7 in changing from the N direction of magnetization, represented by the point 52, to a substantially zero flux condition, represented by the point 55. The condition to be satisfied in limiting the flux change $\Delta\phi_7$ to less than half the total possible flux change is:

$$\Delta\phi_7 = \frac{n_3\phi_3}{n_7} \leq \tfrac{1}{2}\phi_7 \quad (4)$$

where $\phi_7$ is the total flux change produced when the core 7 is switched completely from the N direction of magnetization to the P direction of magnetization. Equation 4 can be satisfied in a number of ways. For example, by making the number of turns $n_7$ in the circulating winding 11 of the core 7 equal to one-half the number of turns $n_3$ in the circulating winding 11 of the core 3 and by making the total flux change $\phi_7$ of the core 7 four times greater than the total flux change $\varphi_3$ of the core 3, there results $$n_7 = \tfrac{1}{2}n_3 \quad (5)$$

and $$\varphi_7 = 4\phi_3 \quad (6)$$

The larger total flux change of the core 7 can be achieved by making the cross-sectional area of the core 7 approximately four times greater than the cross-sectional area of the core 3. Other arrangements of the number of turns $n_7$ and the dimensions of the core 7 can be used in order to satisfy the condition of Equation 4 above.

Following the positive input pulse 44, the negative input pulse 46 is applied to the input winding 13 of the core 3. The M.M.F. generated by the negative pulse 46, indicated in Fig. 3 by the line $nIb$ beneath the loop 31, tends to switch the core 3 from the N direction back to the initial P direction of magnetization. The flux change in the core 3 produces a circulating current $I_4$ in the circulating coil 25 and a load current in the output winding 15. The M.M.F.'s $n_5I_4$ and $n_7I_4$ generated in the respective cores 5 and 7 by the circulating current $I_4$ are each in a direction tending to switch the respective cores 5 and 7. Assuming that the minor hysteresis loops are also rectangular, as is substantially true with rectangular materials, the M.M.F. $n_7I_4$ acting on the core 7 is less than the required coercive force $-X_7$ due to the larger size of the core 7. Therefore, the magnetization of the core 7 remains substantially the same as that represented by the point 55 of the loop 36.

In order for the M.M.F. $n_5I_4$ to succeed in switching the core 5, the M.M.F. acting on the core 5 must exceed the coercive force of the core 5. The coercive force for the core 5 is represented by the point $-X_5$ of the hysteresis loop 34 of Fig. 3. Also, in order to completely switch the core 5 from the P direction to the N direction of magnetization, the following relation must be satisfied because there is substantially no flux change produced in the core 7:

$$n_3\varphi_3 = n_5\phi_5 \quad (7)$$

The condition of Equation 7 can be satisfied by making the number of turns $n_3$ in the circulating winding 11 of the core 3 equal to the number of turns $n_5$ in the circulating winding 11 of the core 5 and by making the dimensions of the cores 3 and 5 approximately the same. Accordingly, the core 5 is switched from the P direction of magnetization to the N direction of magnetization, as represented by the point 56 of the hysteresis loop 34. By Equations 4 and 7 the cross-sectional area of the core 7 is approximately four times greater than that of the core 5, and the number of turns in the circulating winding 11 of the core 7 has approximately one half as many turns $n_7$ as the turns $n_5$ of the circulating winding 11 of the core 5. Thus:

$$\frac{X_7}{n_7} > \frac{X_5}{n_5} \quad (8)$$

Therefore, a larger value of the circulating current $I_4$ is required for switching the core 7 than is required for switching the core 5. Consequently, the M.M.F. $n_5I_4$ acting on the core 5 is approximately two times greater than M.M.F. $n_7I_4$ acting on the core 7, and the coercive force $-X_5$ is exceeded while the coercive force $-X_7$ is not reached. Thus, the core 5 is switched completely from the P direction of magnetization to the N direction of magnetization. The magnetization of the core 7 remains substantially unchanged, as represented in Fig. 3, by the point 55 of the hysteresis loop 36.

A second positive input pulse 44 again generates the magnetizing force $nIa$. The flux change in the core 3 causes the circulating current $I_3$ to flow in the circulating coil 25. The M.M.F.'s $n_5I_3$ and $n_7I_3$ generated by the circulating current $I_3$ are both in a direction tending to switch the respective cores 5 and 7 to the P direction of magnetization, the core 5 from saturation at remanence in the N direction, and the core 7 from substantially a zero flux condition. Referring to Equation 8 above, M.M.F. $n_5I_3$ exceeds the coercive force $+X_5$ for the core 5 before the M.M.F. $n_7I_3$ reaches the coercive force $+X_7$ for the core 7. Consequently, upon the termination of the second positive input pulse, the cores 3 and 5 are each completely switched, the core 3 from the P to the N direction of magnetization, and the core 5 from the N to the P direction of magnetization. The core 7 remains unswitched as represented by the point 55 of the hysteresis loop 36. The relatively large change of flux in the core 3 induces a relatively large output signal across the output winding 15.

A subsequent negative input pulse 46 again reverses the direction of magnetization of the cores 3 and 5, the core 3 from the N to the P direction of magnetization, and the core 5 from the P direction to the N direction of magnetization. The core 7 remains unswitched as described above. The large flux change produced in the core 3 by the negative input pulse also induces a relatively large voltage across the output winding 15.

Successive sequences of pairs of input pulses comprising the positive pulse 44 and the negative pulse 46 reverse the cores 3 and 5 back and forth between the P and the N directions of magnetization. An output voltage is induced across the output winding 15 each time the core 3 is changed from one direction of magnetization to the other. This response condition conveniently can be termed the "unblocked" response condition in the arrangement wherein a utilization device is connected to an output winding linking the core 3.

Accordingly, a positive setting pulse 32 applied to the setting coil 20 places the system in a "blocked" response condition wherein there is no output signal furnished to the utilization device 30 in response to a continuous application of sequences of positive and the negative input pulses. Conversely, a negative setting pulse 43 applied to the setting coil 20 places the system in its unblocked response condition wherein a continuous output signal is furnished to the utilization device 30 in response to sequences of positive and negative input pulses. Once the magnetic system has been set to a desired response condition, it remains in this condition for an indefinitely long time because the setting signal is "remembered" for an indefinitely long time without requiring any holding power. If desired, the input pulses need not be applied periodically. Note that no unilateral conducting devices, such as diodes, are necessary in the circulating loop. Proper operation can be obtained by controlling the relation between the circuit parameters.

The system of the present invention may be advantageously employed for storing information encoded in binary form. Thus, the blocked state, as represented by the flux configuration in Fig. 2, may represent a binary one; and the unblocked condition, as represented by the flux configuration in Fig. 3, may represent a binary zero. The stored information may then be read out by applying a sequence of pulses comprising a positive pulse followed by a negative pulse to the input winding 13. The readout of information is non-destructive because the initial flux configuration is preserved after each sequence of a positive and negative input pulse.

A continuous indication of stored information can be obtained by employing a train of pulse pairs, the polarity of the pulses of a pair alternating. In the prior art, flip-flop circuits and magnetic toroids have been used for storing binary information. In a flip-flop circuit, the D.C. level of one tube furnishes a continuous indication of the stored information. However, a continuous holding power is required. A single toroid is able to store information for an indefinitely long time without requiring any holding power. But, when the information is read out of a single toroid, the state of the toroid must be changed, and consequently the stored information is destroyed. When it is desired to retain information stored in a toroid, auxiliary restoring circuits are required for feeding back the information read out. Accordingly, the system of the present invention can provide desirable characteristics of both the flip-flop circuits and the magnetic toroid storing circuits. Furthermore, auxiliary restoring circuits are not required. Thus, the information can be stored for an indefinitely long time without requiring holding power and the stored information can be read out repeatedly without being destroyed.

The system of the present invention may also be considered as an amplification system which provides a large power or energy gain. For example, the system can be set to one of its response conditions, for example the unblocked response condition, by a setting or a control pulse which has a very small energy level. Subsequent input A.C. power cycles furnish energy to a utilization device. The total amount of the energy furnished the utilization device is determined by the number of cycles of the applied A.C. Thus, the total energy gain over and above the energy contained in the setting pulse can be as large as desired by applying a suitable number of A.C. cycles. If, on the other hand, the system is set to the unblocked response condition by a setting pulse substantially no energy is furnished the utilization device regardless of the number of A.C. cycles applied. In one sense, the output signal furnished the utilization device can be considered a carrier wave which is modulated so as to be at full or zero amplitude in accordance with a single setting signal.

In the previous discussion, the method for setting the system comprised applying each setting pulse for a time required for any circulating current to decay to a substantially zero amplitude. Each setting pulse can be applied either simultaneously or asynchronously with respect to the input pulses. However, if a setting pulse is applied at the same time as an input pulse, the amplitude of the setting pulse must be sufficient to generate an M.M.F. large enough to overcome any opposing M.M.F. generated by an input pulse and to supply the additional M.M.F. which is required to set each of the cores to the desired direction of magnetization.

A more desirable method for setting the system 10, whereby shorter duration setting pulses are used, is as follows: The first setting pulse is one having a relatively long duration, as before, because of possible undesirable initial conditions of one or more of the cores. The system is thus set to one or the other of its response conditions. The second and each subsequent setting pulse, however, are of approximately the same duration as the input pulses because the cores are each in a proper initial condition with respect to subsequent setting pulses. For example, assume that the relatively long duration, positive setting pulse 32 of Fig. 1 is applied, causing the respective cores to be magnetized to the directions as represented in Fig. 2 by the points 40, 41 and 42 of the hysteresis loops 31, 34 and 36, respectively. The system is now in its blocked response condition. The system can be set to its unblocked response condition, as represented in Fig. 3, by the set of points 50, 51 and 52 of the hysteresis loops 31, 34 and 36, respectively, by applying a relatively short-duration, negative setting pulse. By equations 4 and 7 above, $$(9) \qquad n\phi_3 = n_5\phi_5 = 2n_3\phi_3 < n_7\phi_7$$

Therefore, the core 7 can absorb the integrated volt-second outputs of the cores 3 and 5 without exhausting its available flux. Therefore, the cores 3 and 5 are changed completely from the N direction of magnetization to the P direction of magnetization, as the core 7 is changed to the N direction of magnetization, as required. No series resistance is necessary in the circulating coil because the flux changes in the cores 3 and 5 are opposite to the flux change in the core 7.

Accordingly, once the system is initially set to one of its response conditions by a relatively long duration setting pulse, it subsequently can be set to the other of its response conditions by a short-duration setting pulse of a suitable polarity. The short-duration setting pulses can be applied either simultaneously with, or at times different from, the application of the input pulses. If the setting and input pulses are applied simultaneously, the amplitude of any one setting pulse is sufficient to override the effect of any one input pulse.

By way of an example, one operative embodiment of a system, according to Fig. 1, may be made wherein the cores 3 and 5 are made of 20 wraps of ⅛ mil molybdenum-permalloy ribbon wound on a bobbin ⅜ inch in length and ¼ inch diameter. The core 7 is made of a stack of four different cores each similar to the cores 3 and 5. A 30-ohm resistor is connected in the circulating loop 25. The circulating windings 11 of the cores 3 and 5 each have 50 turns and the circulating winding 11 of the core 7 has 25 turns. The impedance of the utilization device 20 is approximately 30 ohms. Suitable operating parameters for such an embodiment are as follows: Each positive pulse 44 has a .2 μsec. (that is, microsecond) rise time and 1 μsec. duration and generates a magnetizing force of 10 ampere-turns in the core 3. Each negative pulse 46 has a .2 μsec. rise time and a 1 μsec. duration and generates a magnetizing force of 1 ampere-turn in the core 3. The duration of the first setting pulse 32 is 30 μsec. and generates a magnetizing force of 3 ampere-turns in each of the cores 3, 5 and 7. Subsequent setting pulses may have a duration of about 1 μsec. Under these operating conditions, there is approximately a 10:1 ratio between the output voltage furnished the utilization device in the unblocked and the blocked conditions, respectively.

Thus far the input signals have been described as asymmetrical pairs of input pulses wherein the positive input pulse has a relatively large amplitude and the negative input pulse has a relatively small amplitude. In certain applications, for example, magnetic amplifiers, it is desirable to supply input signals which are symmetrical about a common reference, for instance, a sinusoidal waveform. An unbalanced drive for the cores can be used by employing the arrangement of Fig. 4.

Figure 4:
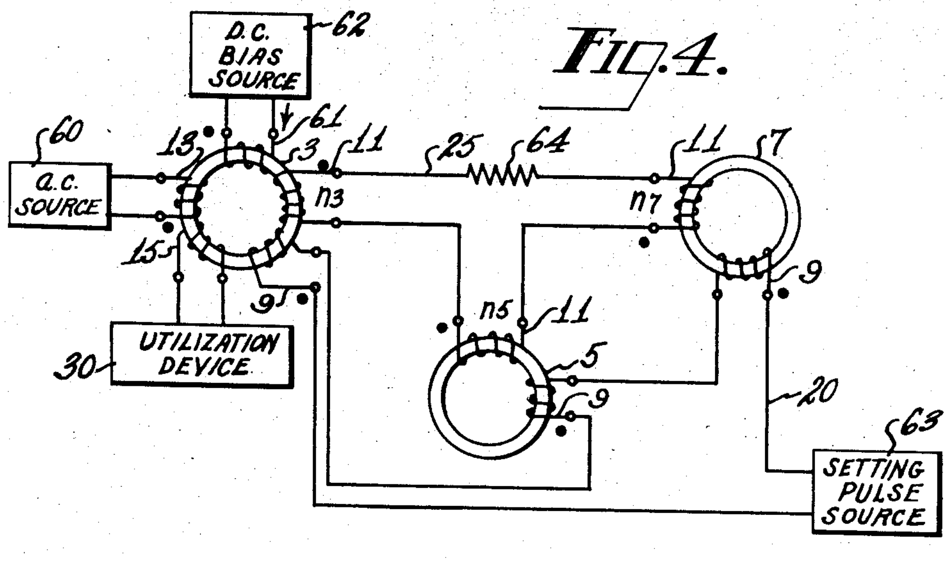
Fig. 4 is a schematic diagram of a magnetic system according to the invention which is arranged to operate in response to symmetrical input pulses.

In Fig. 4, a D.C. bias is applied to the core 3 by a bias winding 61 linked to the core 3. The terminals of the bias winding 61 are connected to a constant-current, D.C. bias source 62. The bias winding 61 is polarized such that the bias current generates an M.M.F. which opposes the M.M.F. generated by the negative phase of the A.C. input signals. Thus, the bias current flows into the unmarked terminal of the bias winding 61. The remanent condition of the core 3 is shifted somewhat due to the presence of the D.C. bias. However, in other respects the operation of the system is similar to that described for the system of Fig. 1.

An improved response time can be achieved by means of the resistor 64 which is connected in series in the circulating coil 25. The circulating current produced by a setting pulse decays more quickly due to the energy dissipated across the resistor 64. The value of the resistor 64 varies directly with the rise time of the A.C. input pulse applied to the input winding 13. For large values of the resistor 64, the A.C. input pulses have a relatively fast rise time. For low values of the resistor 64, the input pulses have a relatively slow rise time. The setting pulse source 63 is a constant-current source which is arranged to furnish the desired positive and negative setting pulses to the setting coil 20.

Figure 5:
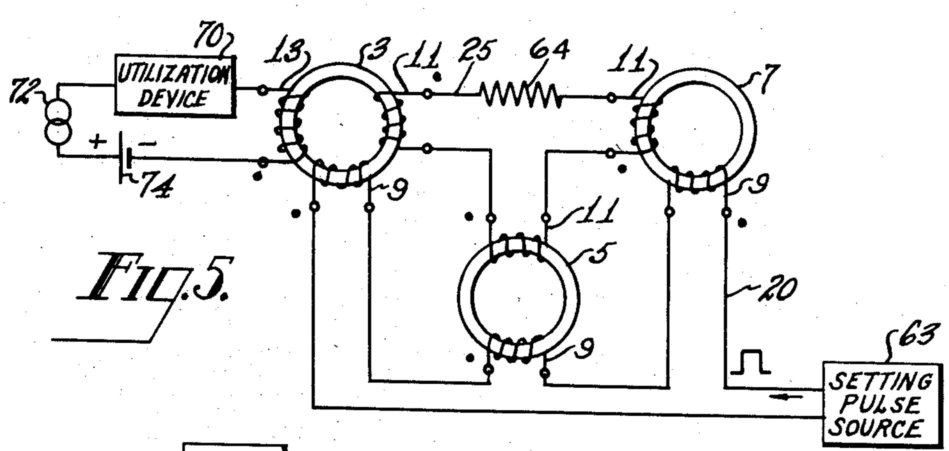
Fig. 5 is a schematic diagram illustrating one manner of connecting the magnetic system of the present invention to a utilization device.

In Fig. 5 there is shown another embodiment of the invention wherein an utilization device 70 is placed in series with the input winding 13 and a voltage source 72 is connected across the utilization device 70 and the input winding 13. A D.C. bias source comprising a battery 74 is placed in series with the voltage source 72 in order to provide an unbalanced drive. The impedance of the utilization device 70 is matched to the system such that the amplitude of negative phase of the A.C. current flowing in the input winding 13 does not generate an M.M.F. greater than the value $nIb$ as explained in connection with Fig. 2. The series-connected resistor 64 is placed in the circulating coil 25 in order to improve the response time during the initial setting.

A positive setting pulse into the dot-marked terminal of setting winding 9 of the core 7 from the constant-current source 63 places the system in its blocked response condition. Now, when the A.C. voltage supplied by the source 72 is applied across the utilization device and the input winding 13, substantially no flux change is produced in the core 3. Consequently, there is very little voltage drop across the input winding 13 and substantially all the A.C. voltage appears across the utilization device 70.

A negative setting pulse in a polarity opposite that shown in Fig. 5, supplied by the setting source 63, sets the system to the unblocked response condition. Now, when the A.C. voltage is applied, large changes of flux are produced in the core 3. Therefore, practically all the A.C. voltage appears across the input winding 13, and substantially no voltage appears across the utilization device 70. Accordingly, when a utilization device is connected in series with the input winding 13, the corresponding characterization of the response conditions as blocked or unblocked should be reversed. That is, in the systems of Figs. 1 and 5, a positive setting pulse sets the system to one condition. In the system of Fig. 1 this one condition is the blocked condition, in which substantially none of the energy supplied by the A.C. input source is transferred to the utilization device 30; whereas, in the system of Fig. 5, this one condition is the unblocked condition in which substantially all the energy supplied by the A.C. input source is transferred to the utilization device 70. A negative setting pulse sets the systems of Figs. 1 and 5 in other condition.

Figure 6:
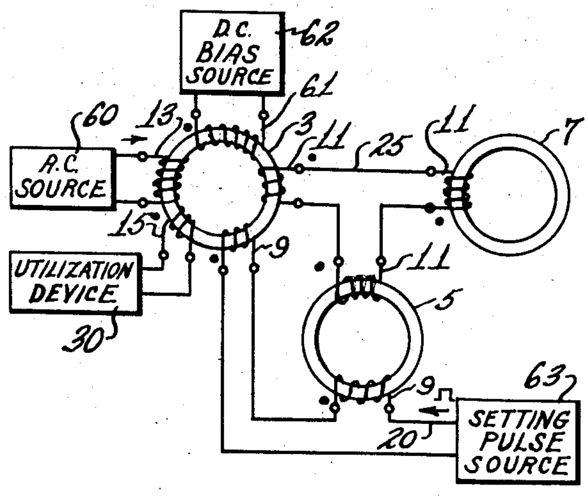
Fig. 6 is a schematic diagram of a modification of the present invention wherein only two of three cores are provided with a setting winding.

The cores 3, 5 and 7 can be magnetized to the respective directions of magnetization, indicated in Fig. 2 as a fabrication step. If the cores are initially premagnetized, it is not necessary thereafter to supply setting pulses to the core 7, and the setting winding 9 for the core 7 can be dispensed with as shown in Fig. 6. The system of Fig. 6 is similar to that of Fig. 4 with the exception that the setting winding 9 for the core 7 is omitted. The setting coil 20 connects the setting winding 9 of the cores 3 and 5 in series aiding. One advantage of using premagnetized cores and only two setting windings is that the back voltages induced in the setting coil 20 are reduced or substantially eliminated. For example, when the system is set to the blocked condition, substantially no flux change is produced in any of the cores by the A.C. input pulses. Therefore, substantially no back voltage is induced in the setting coil 20. When the system is set to its unblocked condition, as shown in Fig. 3, the first, positive phase of the A.C. input signal does produce a flux change $\varphi_3$ in the core 3, while there is substantially no flux change produced in the core 5. Thus, a back voltage is induced across the setting coil 20 by the first positive phase of the A.C. input. Subsequent input pulses of either polarity, however, induce substantially equal and opposite flux changes in the cores 3 and 5. These flux changes induce substantially equal and opposite cancelling voltages in the setting coil 20. In the case of the first, positive phase of the A.C. input, when the system is in the unblocked response condition, the impedance of the setting pulse source 63 appears merely to be additional load linked to the core 3 by the setting coil 20. This additional impedance can be overcome simply by increasing the amplitude of the positive phase of A.C. input by a corresponding amount. However, the impedance of the setting pulse source 63 does not load the cores 5 or 7 for any response condition. Therefore, the setting pulses can be supplied from a source having fairly low impedance without adversely affecting the operation of the system. Additional impedance-matching devices, such as buffer circuits, are not ordinarily necessary.

Figure 7:
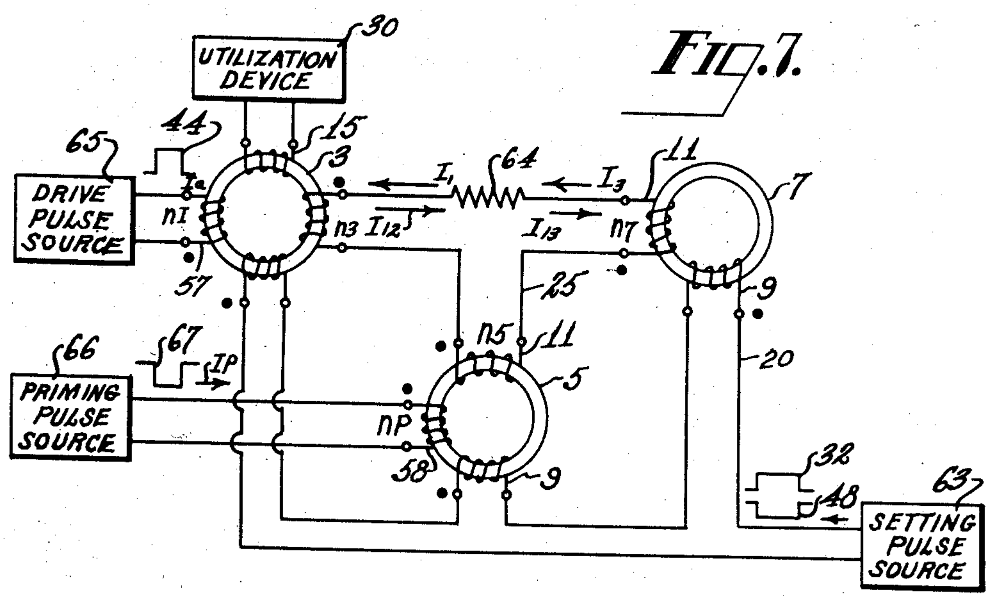
Fig. 7 is a schematic diagram of a modification of the present invention whereby input pulses are applied to two different ones of the cores.

Relatively large amplitude positive and negative input pulses can be employed in the arrangement of the system shown in Fig. 7. The system of Fig. 7 is similar to the system of Fig. 1, with the addition of a winding 58 on the core 5 connected to receive the pulses from a priming pulse source 66. The positive and negative setting pulses are furnished by the setting pulse source 63. A resistor 64 may be connected in series with the circulating coil 25. A drive pulse source 65 furnishes the positive input pulse 44 to the input winding 57 of the core 3. The priming pulse source 66 furnishes a negative input pulse 67 to the input winding 58.

Figure 8:
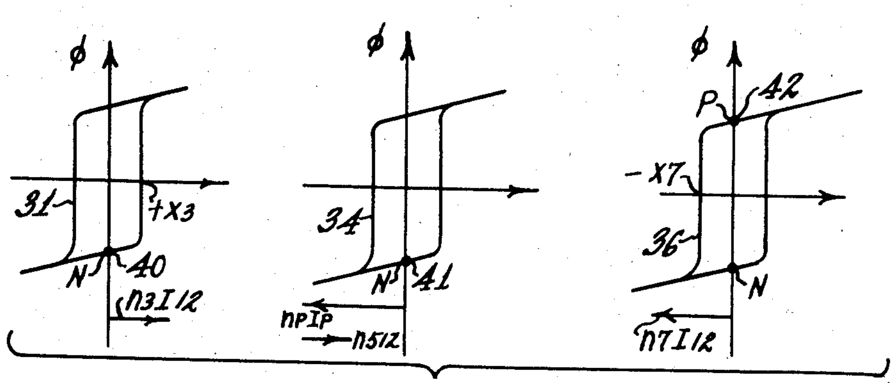
Figs. 8 and 9 are graphs of hysteresis loops useful in explaining the operation of the system of Fig. 7.

The system of Fig. 7 is placed in its blocked condition by applying the positive setting pulse 32 to the setting coil 20. Upon termination of the positive setting pulse, the cores 3 and 5 are saturated at remanence in the N direction, and the core 7 is saturated at remanence in the P direction. The remanent condition of the cores is represented in Fig. 8 by the points 40, 41 and 42 of the hysteresis loops 31, 34 and 36, respectively. The loops of Fig. 8 are the same as those of Fig. 2 and the points 40, 41 and 42 are reached in the same manner as explained in connection with Fig. 2. The positive drive pulse 44 generates the M.M.F. $nIa$ in the core 3 and the circulating current $I_1$ in the circulating coil 25. The response of the system to the drive pulse 44 is the same as that described for the system 10 of Fig. 1 and substantially no flux change is produced in any of the cores by the drive pulse 44. The priming pulse source 66 is then operated and applies the negative priming pulse 67 to the input winding 58 of the core 5. The M.M.F. $n_pI_p$ (where $n_p$ is the number of turns in the winding 58) is generated in the core 5 by the priming pulse 67. The M.M.F $n_pI_p$ tends to drive the core 5 further into saturation in the N direction of saturation. Due to the finite slope of the hysteresis loop 34, a small circulating current $I_{12}$ flows in the circulating coil 25. The circulating current $I_{12}$ generates the M.M.F.'s $n_3I_{12}$, $n_5I_{12}$ and $n_7I_{12}$ in the cores 3, 5 and 7, respectively. The M.M.F. $n_3I_{12}$ tends to change the core 3 from the N direction of saturation to the P direction of saturation, and the M.M.F. $n_7I_{12}$ tends to change the core 7 from the P direction of saturation to the N direction of saturation. The M.M.F. $n_5I_{12}$ is in a direction to oppose the M.M.F. $n_pI_p$ and reduces the value of the M.M.F. $n_pI_p$ by a small amount. The amplitude of the priming pulse 67 is limited to a value such that the M.M.F. $n_3I_{12}$ is less than the coercive force $+X_3$ of the core 3. Accordingly, neither the core 5 nor the core 7 changes its direction of saturation. Upon termination of the priming pulse 67, the cores 3, 5 and 7 return to their previous remanent conditions represented by the points 40, 41 and 42 of the hysteresis loops 31, 34 and 36, respectively. Therefore, in the blocked response condition neither the drive pulse 44 nor the priming pulse 47 changes the magnetization of any of the cores. Consequently, substantially no energy is transferred to the utilization device.

Note that both the drive pulse 44 and the priming pulse 67 can be of relatively large amplitude, whereas, in the system of Fig. 1, the amplitude of the negative pulse 47 is limited to a value substantially less than that of the positive pulse 44. A larger-amplitude, negative input pulse is advantageous where it is desired to transfer a maximum amount of energy to a load when the system is in the unblocked response condition.

Figure 9:
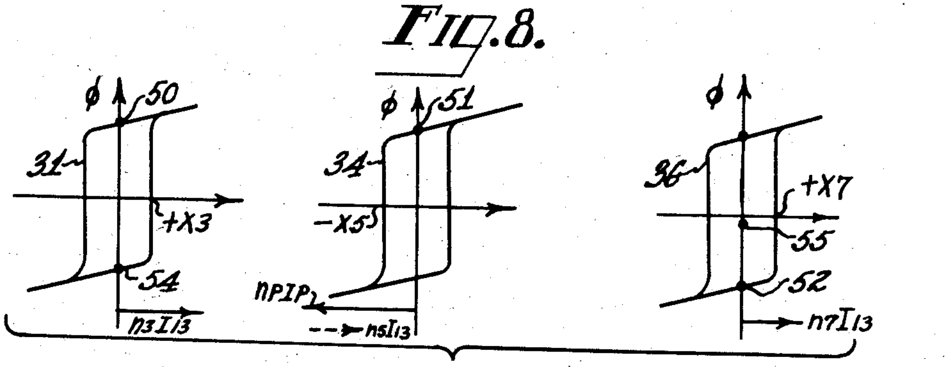

The system can be placed in its unblocked response condition by applying the negative setting pulse 48 to the setting coil 20. Upon termination of the negative setting pulse 48, the cores 3 and 5 are switched to the P direction of saturation and the core 7 is switched to the N direction of saturation. The remanent condition of the cores 3, 5 and 7 is represented in Fig. 9 by the points 50, 51 and 52 of the hysteresis loops 31, 34 and 36, respectively. The loops of Fig. 9 are the same as those of Fig. 3 and the points 50, 51 and 52 are reached in the same manner explained in connection with Fig. 3.

The first positive drive pulse 44 operates to switch the core 3 from the P direction of saturation to the N direction of saturation, and to switch the core 7 by the current circulating in the circulating coil 25 from the N direction off saturation to a substantially zero saturation condition. The effect produced by the first positive drive pulse 44 is explained in detail in connection with Fig. 3. The remanent condition of the cores 3, 5 and 7, upon termination of the drive pulse 44, is represented in Fig. 9 by the points 54, 51 and 55 of the hysteresis loops 31, 34 and 36, respectively. The points 54 and 55 are the same as those of Fig. 3.

The negative priming pulse 67 is applied to the input winding 58 of the core 5 after the drive pulse 44 is terminated. The M.M.F. $n_pI_p$ is generated in the core 5 by the priming pulse 67. A circulating current $I_{13}$ flows in the circulating coil 25 during the switching of the core 5. The circulating current $I_{13}$ generates the M.M.F.'s $n_3I_{13}$, $n_5I_{13}$ and $n_7I_{13}$ in the cores 3, 5 and 7, respectively. The net M.M.F. acting on the core 5 exceeds the coercive force $-X_5$ of the core 5, and the M.M.F. $n_3I_{13}$ acting on the core 3 exceeds the coercive force $+X_3$ of the core 3. Therefore, the core 5 is switched from the P direction of saturation to the N direction of saturation, and the core 3 switched from the N direction of saturation back to the P direction of saturation. The M.M.F. $n_7I_{13}$ acting on the core 7 is less than the coercive force $+X_7$ of the core 7 for the same reasons which are outlined above in connection with Fig. 1. That is, the number of turns $n_7$ is approximately one-half the number of turns either on $n_3$ or $n_5$. Likewise, the total flux $\phi_7$ of the core 7 is approximately four times greater than the total flux $\phi_3$ or $\phi_5$ for the core 3 or 5, respectively. Accordingly, the core 7 remains substantially in the zero flux condition.

Th priming pulse source 66 may be designed to provide a priming pulse 67 having an amplitude as great as that of the drive pulse 44, or even greater. However, with increase in the amplitude of the priming pulse 67, a slower rise time thereof is desirable. Thus, the rise time of a priming pulse 67 is preferably less than the rise time of an equal-amplitude driving pulse 44. The slower rise time is desirable because a reflected M.M.F. is produced by the load current which flows during the switching of the core 3. This reflected M.M.F. opposes the M.M.F. $n_3I_{13}$ and, conceivably, could prevent the core 3 from completely switching if the priming pulse 67 had a very fast rise time. However, the amplitude of the priming pulse 67 can be as large as that of the drive pulse 44 by providing the priming pulse with a slower rise time. In this respect, the operation of the system of Fig. 7 differs from that of Fig. 1. In the system of Fig. 1 the amplitudes of the negative input pulses are limited to a value substantially less than those of the positive input pulses. However, in the system of Fig. 1, the rise times of the positive and negative input pulses can be as short as desired, whereas, in Fig. 7 the rise times of the priming pulses are restricted.

The cores 3 and 5 are again switched by a subsequent positive drive pulse 44 and the core 7 remains substantially unchanged. Repeated sequences comprising a drive pulse, followed by a priming pulse, switches the cores 3 and 5 back and forth between the two directions of saturation. Each time the core 3 is switched, energy is transferred to the utilization device 30.

The system of Fig. 7 can be placed in its blocked response condition by applying a new, positive setting pulse after any one priming pulse 67. The positive setting pulse drives the core 7 from a substantially zero flux condition to saturation in the P direction, and the core 3 from the P direction of saturation to saturation in the N direction. The core 5 is already in the N direction of saturation due to the preceding priming pulse 67. Now, subsequent driving and priming pulses are blocked and substantially no energy is transferred to the utilization device 30.

Note that if the initial directions of magnetization of the cores are proper, as by premagnetizing, then the setting pulse need be applied only to the setting winding 9 of the cores 3 and 5 or, alternatively, only to the setting winding of the core 7. This results from the fact that the core 7 can absorb the total flux changes of both the cores 3 and 5. For example, in switching from the blocked to the unblocked response condition, the cores 3 and 5 change completely from the N direction to the P direction of magnetization and the core 7 changes from the P direction to the N direction of magnetization. Thus, by applying a setting pulse only to the cores 3 and 5, the resulting circulating current causes the core 7 to completely switch because, in the language of the art, the total flux in the system is "conserved," that is, the total flux in the magnetic system of the invention remains the same after the first setting pulse. Also, by applying a setting pulse to the core 7 only, the resulting circulating current causes both the cores 3 and 5 to completely switch because of the larger total flux in the core 7. The total flux is still conserved.

Once the proper initial conditions of magnetization are present, substantially all the flux in the system is conserved. Thus, equal and opposite flux changes are produced by both setting and input impulses. Therefore, assuming the correct initial conditions of magnetization, as preferably obtain in practice, no resistor is necessary in the circulating loop 25. Thus, with substantially zero resistance in the circulating loop 25, the switching time of the system can be extremely fast. A single A.C. input source can be employed for the two sources 65 and 66 by providing unilateral conducting devices for blocking application of the negative phase from the core 3 and the positive phase from the core 5.

Figure 10:
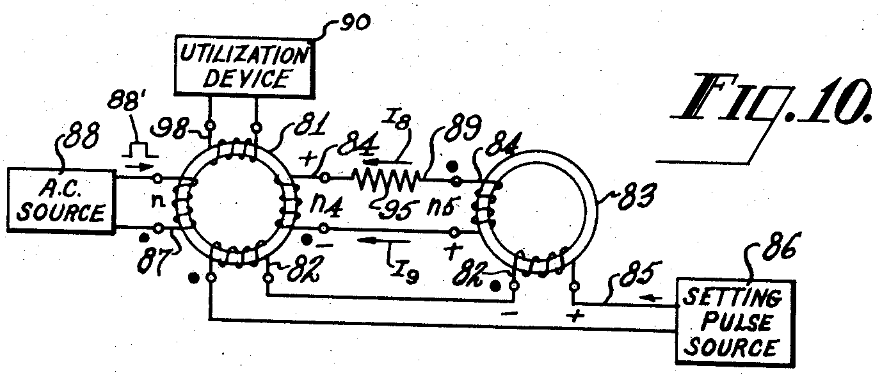
Fig. 10 is a schematic diagram of another embodiment of the invention employing two magnetic cores.

In Fig. 10, there is shown a modification of the invention which employs but two cores. Each of the cores 81 and 83 is linked by a setting winding 82 and a circulating winding 84. The setting windings 82 are connected in series aiding to form a setting coil 85. The setting coil 85 is connected to a setting pulse source 86. The setting source 86 may be any suitable source arranged to furnish the single setting pulse of either the one or the other polarity and may be a constant-current source, although a constant-current source is not required. The circulating windings 84 are connected in series aiding with each other and in series with a resistor 95 to form a circulating coil 89. An input winding 87 is linked to the core 81. The terminals of the input winding 87 are connected to a constant-current A.C. source 88. An output winding 98 is linked to the core 81 and the terminals of the output winding are connected to a utilization device 90. Alternately, the A.C. source 88 may be a voltage source, and the utilization device 90 can be connected in series with the input winding 87, as described in connection with the system of Fig. 5. In such case, the impedance of the utilization device 90 is matched to the input of the system and a suitable D.C. bias is used to obtain the unbalanced drive.

Figure 11:
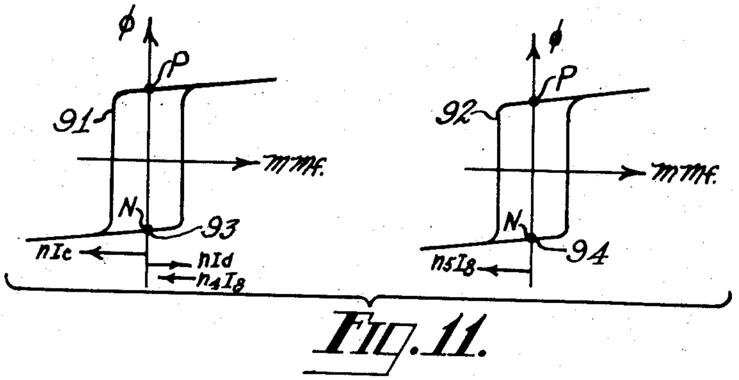
Figs. 11 and 12 are graphs, somewhat idealized, of the hysteresis loops of the corresponding cores of Fig. 10, and are useful in explaining the operation of the system of Fig. 10.

In operation, the system of Fig. 10 is placed in its blocked response condition by applying a positive pulse to the setting coil 85. The positive setting pulse is of a sufficiently long duration such that any circulating current produced thereby can decay to zero. The decay time of the circulating current is a function of the *L/R* time constant of the circulating coil 89. Upon termination of the positive setting pulse, both the core 81 and the core 83 are magnetized to the N direction of magnetization. The remnant condition of the cores is represented in Fig. 11 by the points 93 and 94 on the hysteresis loops 91 and 92, respectively. The hysteresis loop 91 corresponds to that for the core 81, and the hysteresis loop 92 corresponds to that for the core 83.

After the system is set to its unblocked response condition, a first, positive input pulse 88', as indicated in Fig. 10, is applied to the unmarked terminal of the input winding 87 by the A.C. source 88. This input pulse 88' generates an M.M.F. $nIc$, indicated in Fig. 11. The M.M.F. $nIc$ tends to drive the core 81 further into the N direction of magnetization. Thus, very little flux change is produced in the core 81 and, accordingly, substantially no circulating current flows in the circulating coil 89 and the magnetization of the core 83 remains unchanged. When the positive input pulse is terminated, both cores return to the initial N direction of magnetization.

Following the positive input pulse, a negative input pulse is applied to the unmarked terminal of the input winding 87, and an M.M.F. is generated which tends to drive the core 81 from the N direction of magnetization to the P direction of magnetization. This M.M.F. is indicated in Fig. 8 by the line $nId$ below the loop 91. The flux change in the core 81 produces a circulating current $I_8$ in the circulating coil 87 which current is in a direction so as to generate an M.M.F. tending to oppose the M.M.F. $nId$. The M.M.F. produced by the circulating current $I_8$ is indicated in Fig. 8 by the lines $n_4L_8$ and $n_5I_8$ below the respective hysteresis loops 91 and 92.

Again, for the reasons previously mentioned, the amplitude of the negative input pulse is limited to a value which is insufficient to generate a net M.M.F. in excess of the coercive force of the core 81. Consequently, the core 81 remains magnetized in the N direction. The M.M.F. $n_5I_8$ acting on the core 83 tends to drive it further into saturation in the N direction. Upon termination of the negative input pulse, the cores return to the initial N direction of magnetization. Accordingly, the system of Fig. 10 remains blocked for either polarity of the input pulse and substantially no energy is transferred to the utilization device 90.

Assume, now, that a negative setting pulse is applied to the setting coil 85. The M.M.F. generated by the negative setting pulse is in a direction tending to drive the cores 81 and 83 to the P direction of magnetization in a manner similar to that described for the positive setting pulse. The points 99 and 100 of the hysteresis loops 91 and 92 of Fig. 12 represent the magnetization of the respective cores 81 and 83 upon the termination of the negative setting pulse.

Now, a positive input pulse from the A.C. source 88 generates an M.M.F. which tends to drive the core 81 from the P direction of magnetization to the N direction of magnetization. This M.M.F. is indicated in Fig. 12 by the line *nIc* below the hysteresis loop 91. A circulating current $I_9$, in a direction tending to oppose the M.M.F. *nIc*, is caused to flow in the circulating coil 89 due to the flux change in the core 81.

The M.M.F. $n_5I_9$ generated by the circulating current $I_9$ in the core 83 tends to drive the core 83 further into saturation in the P direction of magnetization. The M.M.F. $n_5I_9$ is indicated by a line beneath the loop 92 of Fig. 12. A small flux change is produced in the core 83 because of the correspondingly small but finite slope of the upper portion of the hysteresis loop 92. The flux in the core 81 can thus change to a small degree, the point representing the state of the core tranversing a minor hysteresis loop 102 having as its lowest point the point 104. The following negative input pulse applied to the input winding 87 by the source 88 generates an M.M.F. which tends to drive the core 81 towards the P direction of magnetization. This M.M.F. is indicated in Fig. 12 by the line *nId*. However, because of the limited amplitude of the negative input pulse the core 81 is driven along the minor hysteresis loop 102 to a point 103. Upon the termination of the negative input pulse, the core 81 is magnetized to a condition represented by the point 105 which is located below the initial point 99. Thus, there is an effective flux loss in the core 81 each time a positive input pulse is applied primarily due to the $I^2R$ loss produced by relatively large circulating current $I_9$. The flux change produced in the core 81 by the M.M.F. *nId* produces a circulating current $I_{10}$ in the circulating coil 89. The circulating current $I_{10}$ generates the back M.M.F. $n_4I_{10}$ in the core 81 and the M.M.F. $n_5I_{10}$ in the core 83. The M.M.F. $n_5I_{10}$ acting on the core 83 can change the magnetization of the core 83 by an amount proportional to the change produced in the core 81. The next positive pulse, however, returns the magnetization of the core 83 to that represented by the initial point 100.

Figure 12:
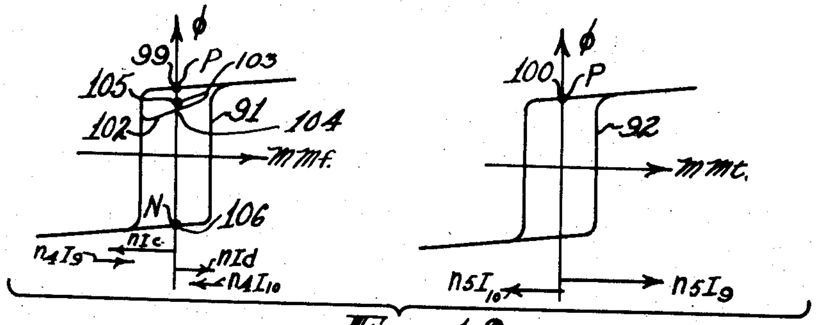

Upon repeated applications of the sequence of a relatively large amplitude, positive input pulse, followed by a relatively small amplitude, negative input pulse, from the source 88, the core 81 completely changes its magnetization from the P direction along a series of minor hysteresis loops to a remanent saturation condition in the N direction of magnetization represented in Fig. 12 by the point 106.

The rise time of the input pulses is adjusted in accordance with the value of the additional resistance inserted in the circulating loop. Fast rise times are employed in conjunction with high resistance values.

When the core 81 becomes magnetized to the condition represented by the point 106 of the loop 91, a negative input pulse now completely reverses the direction of magnetization of both the cores 81 and 83. Subsequent sequences of positive and negative input pulses then operate to switch the cores 81 and 83 back and forth between saturation in the P and the N directions of magnetization. Each time a flux reversal is produced in the core 81, an output voltage is induced across the output winding 98.

The time for switching the system of Fig. 10 from the blocked to the unblocked condition depends upon the frequency of the input pulses. In practical applications, a high frequency A.C. source is preferred in order to shorten the switching time. The switching time for the three-core systems previously described in shorter than that for the two-core system of Fig. 10. In the three-core systems, the useful output is produced by the very first A.C. cycle following an unblocking setting pulse, whereas, in the system of Fig. 10, the useful output lags the unblocking setting pulse by a number of cycles of the A.C. Again, there is substantially very little or no voltage induced in the setting coil 85 when input pulses are applied to the input winding 87. Consequently, there is substantially no interaction between the A.C. pulse source 88 and the setting pulse source 86, and a relatively low impedance setting source can be employed.

Figure 13:
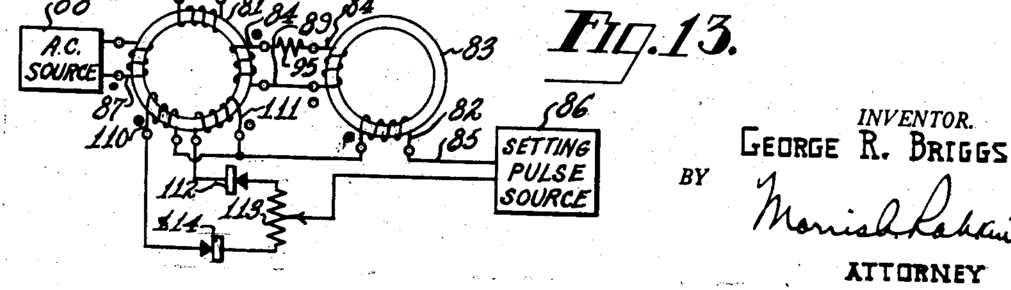
Fig. 13 is a schematic diagram of a magnetic system whereby an improved response time is obtained in a two-core system according to the present invention.

An improved response time can be achieved in a system having only two cores by employing the modification shown in Fig. 13. The system of Fig. 13 is similar to the system of Fig. 10 with the exception that the core 81 is linked by two different setting windings 110 and 111. The marked terminal of the setting winding 82 of the core 83 is connected to the marked terminal of the setting winding 111 and the unmarked terminal of the setting winding 110. The unmarked terminal of the setting winding 111 is connected through a diode 112 poled to pass a negative current to one terminal of a potentiometer 113. The marked terminal of the setting winding 110 is connected through a diode 114 poled to pass a positive current to the other terminal of the potentiometer 113. The arm of the potentiometer 113 is connected to the setting pulse source 86.

A positive setting pulse 86 applied to the unmarked terminal of winding 82 is passed through the series circuit comprising the setting windings 82 and 110, the diode 114, and the potentiometer 113, back to the setting pulse source 86. Current through the winding 111 is blocked by the diode 112. This positive setting pulse drives both the cores 81 and 83 to the N direction of magnetization. Thus, as described in connection with Fig. 10, the system is blocked for either polarity of input pulses.

A negative setting pulse from the setting pulse source 86, applied to the unmarked terminal of the winding 82, is passed through the series circuit comprising the setting windings 82 and 111, the diode 112, and the potentiometer 113 back to the setting pulse source 86. Current through the winding 110 is blocked by the diode 114. Now, the cores 81 and 83 are each magnetized in the N and P directions, respectively. The core 81, therefore, is switched almost immediately to the N direction of magnetization as represented by the point 106 of Fig. 12, thus to set the system to its unblocked response condition. Accordingly, the energy supplied by the input pulses is transmitted to the utilization device 90 almost immediately after the system is set to its unblocked response condition. The potentiometer 113 prevents currents induced in the setting windings of the core 81 from being short-circuited through the oppositely polarized diodes 112 and 114. However, because of the voltage drop across a portion of the potentiometer 113 resulting from a flux change in the core 81, the setting pulse source 86 is preferably one having a high impedance.

There have been described herein novel magnetic circuits each of which is characterized by having two different response conditions. In one response condition input energy is transferred to a utilization device, and in the other response condition input energy is blocked from a utilization device. The one response condition is set by a single setting impulse of one polarity. The other response condition is set by a single setting impulse of the polarity opposite the one polarity. No holding power is required and, once a response condition is set, input energy is continuously transferred or continuously blocked in accordance with the polarity of the setting impulse. The magnetic systems may be employed advantageously in electrical computing systems wherein the one response condition corresponds to the storage of a binary one and the other response condition corresponds to the storage of a binary zero. The system can be triggered to one or the other response conditions by a suitable polarity setting pulse. Repeated interrogation can be obtained without requiring additional feedback circuitry. Also, the access time for interrogating the stored information can be improved because feedback circuitry is not required.

Each of the magnetic systems of the present invention can also be employed in the manner of a magnetic amplifier wherein a large amount of energy is supplied to a utilization device in accordance with relatively small amount of energy contained in one setting pulse. In such case, the energy may consist of intelligence, power, etc. The pairs of input pulses may be applied periodically or aperiodically.

What is claimed is:

1. A magnetic system comprising at least two magnetic cores each characterized by a substantially rectangular hysteresis loop and each having two directions of magnetization, a circulating coil linking all of said cores, a setting coil linking at least one of said cores, an input winding linking at least one of said cores, means for applying selectively a single setting pulse of either the one or the other polarity to said setting coil to cause each of said cores to be saturated at remanence in a desired one of said directions of magnetization, and means for applying A.C. signals to said input winding neither phase of said signals producing a substantial flux change in any of said cores for said one polarity setting pulse and each phase of said A.C. signals producing a relatively large flux change in one of said cores for said other polarity setting pulse, said flux change in said one core causing a circulating current to flow in said circulating coil, said circulating current producing a relatively large flux change in another of said cores than said one core.

2. A magnetic system as recited in claim 1 wherein said A.C. signals are symmetrical, and means for applying a D.C. bias to one of said cores.

3. A magnetic system as recited in claim 1 wherein said setting means includes means for applying a first setting impulse and thereafter applying setting impulses each having a duration short relative to said first setting impulse.

4. A magnetic system as recited in claim 1, said setting impulses being applied simultaneously with said A.C. signals.

5. A magnetic system as recited in claim 1, said setting impulses being applied asynchronously with respect to said A.C. signals.

6. A magnetic system as recited in claim 1 including an output winding linked to said one core and a utilization device connected to said output winding, and wherein said A.C. signals are constant-current signals.

7. A magnetic system as recited in claim 1 said system including three different magnetic cores, said setting coil linking each of said cores by means of an individual setting winding linking a respective one of said cores, the setting windings of a first and second of said cores being polarized in one sense and the setting winding of the third core being polarized on the opposite sense, and said input winding being linked to said first core.

8. A magnetic system as recited in claim 1 said system including three different magnetic cores, and said setting coil being linked to only two of said cores.

9. A magnetic system as recited in claim 1 said system having only two magnetic cores, said setting coil linking each of said cores, and means connecting a resistance in series in said circulating coil.

10. A magnetic system as recited in claim 1 including three different magnetic cores said setting coil linking each of said cores, said means for applying A.C. signals including a first input winding linking a first of said cores and a second input winding linking a second of said cores, and means for applying each positive phase of said A.C. signals to said first input winding and each negative phase of said A.C. signals to said second input winding.

11. A magnetic system comprising three magnetic cores each characterized by a substantially rectangular hysteresis loop and each having two directions of magnetization, a closed circulating coil linking all said cores in the same one sense, setting means for saturating at remanence a certain one of said cores selectively either in the one or the other of said directions of magnetization and simultaneously saturating at remanence the remaining two cores correspondingly in the other or the one of said directions of magnetization, and means for applying A.C. input pulses to one of said remaining two cores, said input pulses producing a flux change in said cores only when said certain one core is saturated at remanence in the one direction of magnetization.

12. A magnetic system as recited in claim 11 wherein said setting means includes a setting coil and means for applying selectively a single setting impulse of either the one polarity or the polarity opposite the one polarity to said setting coil.

13. A magnetic system as recited in claim 11 including an output winding linked to one of said remaining two cores.

14. A magnetic system as recited in claim 11 including a closed circulating coil linking each of said cores, said input pulses inducing circulating currents in said loop for causing flux changes in said cores.

15. A magnetic system comprising at least two magnetic cores each characterized by a substantially rectangular hysteresis loop and each having two directions of magnetization, a setting coil linking at least one of said cores, a circulating coil linking all of said cores in series aiding relationship, a utilization device coupled to one of said cores, means including at least one input winding for connecting alternating polarity input signals to at least one of said cores, means for applying selectively a single setting pulse of either the one of the other polarity to said setting coil, said one polarity setting pulse blocking an energy transfer to said utilization device for either phase of said input signals and said other polarity setting pulse permitting an energy transfer to said utilization device for each phase of said input signals.

16. A magnetic system comprising three magnetic cores each characterized by a substantially rectangular hysteresis characteristic and each having two directions of magnetization, a circulating winding linking each of said cores, means connecting said circulating windings on said three cores exclusively to form a closed circulating loop, means applying a magnetizing force to at least one of a first and second of said cores wherein the product $n\phi$, where $n$ is the number of turns in a given circulating winding and $\phi$ is the largest flux change produced in said cores when said magnetizing force is applied, for said first core is substantially equal to that for said second core and substantially less than that for the third of said cores and means for setting said cores to desired directions of magnetization.

17. In a magnetic system, the combination of a first, a second and a third magnetic core, each characterized by a substantially rectangular hysteresis loop and each having two directions of magnetization, a circulating winding linking each of said cores, and means connecting said circulating windings on said cores exclusively to form a closed circulating coil, wherein the value of the ratio $X/n$ for said third core where X is the M.M.F. required to drive said third core from one direction of magnetization to the other, and $n$ is the number of turns in the circulating winding linking said third core is different from the value of corresponding ratios for said first and second cores, respectively.

18. A magnetic system comprising two different magnetic cores each of said cores being characterized by a substantial rectangular hysteresis loop, a setting coil linked in series aiding relationship to each of said cores, a pair of circulating windings each linked to a different one of said cores, a resistance element, means connecting said circulating windings in series aiding relationship to each other and in series with said resistance element to form a closed circulating coil, an input winding and an output winding each linked to one of said cores, means for applying selectively setting impulses of either the one polarity or the polarity opposite the one polarity to said setting coil, and means for applying A.C. input signals to said input winding.

19. A magnetic system as recited in claim 18 including a bias winding linked to said one core, said input pulses being symmetrical with respect to each other.

20. A magnetic system comprising a first, a second and a third magnetic core each of said cores being characterized by substantial saturation at remanence, a different setting winding linked to each of said cores, a different circulating winding linked to each of said cores, and an input and an output winding each linked to said first core, means connecting the setting windings of said first and second cores in series aiding relationship with each other and in series opposition relationship to the setting winding of said third core to form a setting coil, means connecting said circulating windings in series aiding relationship with each other to form a closed circulating coil, means for applying A.C. input signals to said input winding, and means for preventing a substantial flux change in said third core after the application of the first phase of said A.C. signals.

21. A magnetic system as claimed in claim 15, said setting coil including a first and a second setting winding linked to a first of said cores in opposite senses, a third setting winding linked to a second of said cores, means connecting one terminal of said third setting winding in parallel with one terminal of each of said first and second setting windings, a first and a second unilateral conducting device, said first unilateral conducting device being poled to pass one polarity current and said second unilateral conducting device being poled to pass the other polarity current, means connecting the other terminal of said first setting winding in series with said first unilateral conducting device, means connecting the other terminal of said second setting winding in series with said second unilateral conducting device, a potentiometer, said potentiometer being connected across said first and said second unilateral conducting devices, said one polarity setting pulse being blocked from said first setting winding by said first unilateral conducting device and said other polarity setting pulse being blocked from said second setting winding by said second unilateral conducting device.

22. In a magnetic system having three different magnetic cores each of said cores being characterized by substantial saturation at remanence, a setting coil linked in a desired sense to each of said cores, a circulating coil linked to each of said cores in series aiding relation and closed upon itself, and an input winding linked to a first of said cores, the combination of means for applying a setting impulse of a desired polarity to said setting coil thereby to saturate at remanence said first and second cores in one direction of magnetization and the third core in the other direction of magnetization, and means for applying A.C. input pulses to said input winding, one of said input pulses producing a flux change in said first core from the one direction of magnetization to the other direction of magnetization and producing a flux change in said third core from saturation in the direction of magnetization to a substantially zero flux condition and the input pulses succeeding said one pulse producing flux changes in said first and second cores.

23. In a magnetic system having at least two different magnetic cores, each of said cores being characterized by substantial saturation at remanence, setting means linking each of said cores, a circulating loop closed upon itself and linking all said cores, an input winding linking a first of said cores, means for applying a setting pulse to said setting means thereby to saturate at remanence one of said cores in one direction of magnetization and the remaining of said cores in the other direction of magnetization, and means for applying alternating input pulses to said input winding, said alternating input pulses having a larger amplitude in one polarity than in the other polarity.

References Cited in the file of this patent

UNITED STATES PATENTS

| | | |
|---|---|---|
| 2,697,825 | Lord | Dec. 21, 1954 |
| 2,719,773 | Karnaugh | Oct. 4, 1955 |
| 2,719,961 | Karnaugh | Oct. 4, 1955 |
| 2,722,603 | Dimond | Nov. 1, 1955 |
| 2,729,807 | Paivinen | Jan. 3, 1956 |
| 2,729,808 | Auerbach | Jan. 3, 1956 |
| 2,741,757 | Devol | Apr. 10, 1956 |
| 2,741,758 | Cray | Apr. 10, 1956 |
| 2,742,632 | Whitely | Apr. 17, 1956 |

OTHER REFERENCES

"A Radio-Frequency Nondestructive Readout for Magnetic-Core Memories," by B. Widrow, published December 1954 in "IRE Transactions—Electronic Computers," vol. EC-3, Issue 4, pp. 12-15.

UNITED STATES PATENT OFFICE

CERTIFICATE OF CORRECTION

Patent No. 2,886,801

May 12, 1959

George R. Briggs

It is hereby certified that error appears in the printed specification of the above numbered patent requiring correction and that the said Letters Patent should read as corrected below.

Column 5, lines 39 and 40, for "despite applications" read -- despite repeated applications --.

Signed and sealed this 3rd day of November 1959.

(SEAL)
Attest:

KARL H. AXLINE
Attesting Officer

ROBERT C. WATSON
Commissioner of Patents